(12) United States Patent
Baldeosingh et al.

(10) Patent No.: US 8,127,897 B2
(45) Date of Patent: Mar. 6, 2012

(54) CALIPER BRAKE SYSTEM

(75) Inventors: Howard H. Baldeosingh, Saint Joseph, MI (US); Brian P. Dennis, Kalamazoo, MI (US); Norman D. Crawford, Saint Joseph, MI (US); Peter J. Pozivilko, Saint Joseph, MI (US)

(73) Assignee: Ausco Products, Inc., Benton Harbor, MI (US)

( * ) Notice: Subject to any disclaimer, the term of this patent is extended or adjusted under 35 U.S.C. 154(b) by 864 days.

(21) Appl. No.: 12/217,178

(22) Filed: Jul. 2, 2008

(65) Prior Publication Data

US 2009/0026024 A1    Jan. 29, 2009

Related U.S. Application Data

(60) Provisional application No. 60/961,881, filed on Jul. 25, 2007.

(51) Int. Cl.
*F16D 55/22* (2006.01)

(52) U.S. Cl. ............. 188/72.3; 188/72.1; 188/72.4; 188/106 F; 188/166; 188/170

(58) Field of Classification Search .......... 188/72.3, 188/72.1, 72.4, 71.8, 166, 170, 106 F, 106 P, 188/196 C, 216, 73.44, 73.45, 73.46; 267/168
See application file for complete search history.

(56) References Cited

U.S. PATENT DOCUMENTS

| | | | | |
|---|---|---|---|---|
| 3,297,115 A | * | 1/1967 | Waloen et al. | 188/170 |
| 3,633,715 A | | 1/1972 | Burnett | 188/170 |
| 3,647,030 A | | 3/1972 | Burnett | 188/72.3 |
| 3,661,230 A | | 5/1972 | Burnett | 188/71.9 |
| 3,726,367 A | * | 4/1973 | Evans | 188/106 P |
| 3,752,272 A | * | 8/1973 | Ooka | 188/345 |
| 3,791,492 A | * | 2/1974 | Neilsen | 188/170 |
| 3,944,027 A | * | 3/1976 | Yamamoto | 188/71.9 |
| 3,995,722 A | * | 12/1976 | Jones et al. | 188/71.9 |
| 4,014,414 A | * | 3/1977 | Yamamoto et al. | 188/170 |
| 4,030,577 A | * | 6/1977 | Ogawa et al. | 188/71.9 |
| 4,596,313 A | * | 6/1986 | Metoyer | 188/18 A |
| 4,709,789 A | * | 12/1987 | Czich et al. | 188/73.44 |

(Continued)

FOREIGN PATENT DOCUMENTS

GB      889023      1/1962      ........... 103/1

OTHER PUBLICATIONS

EPO Search Report dated Nov. 27, 2008 (7 pages).
May 12, 2004 Caliper Asembly Drawings No. 83976 of brake of Ausco Products, Inc., Benton Harbor, Michigan.
Oct. 24, 2001 Caliper Asembly Drawings No. 81045 of brake of Ausco Products, Inc., Benton Harbor, Michigan.

(Continued)

*Primary Examiner* — Robert A Siconolfi
*Assistant Examiner* — Mariano Sy
(74) *Attorney, Agent, or Firm* — Renner, Kenner, Greive, Bobak, Taylor & Weber

(57) ABSTRACT

A caliper brake system includes a housing, a bore within the housing, and a piston slidably positioned within the bore. The brake system also includes a spring assembly, a fluid chamber defined by the bore and the piston, and a hydraulic fluid supply network. The spring assembly provides a biasing force to maintain the piston in an actuated position engaging a stator which engages the rotor of a vehicle. The hydraulic fluid supply network provides pressurized fluid to the fluid chamber to selectively overcome the biasing force of the spring assembly and move the piston to an unactuated position to release the rotor. Thus, the caliper brake is spring actuated and hydraulically released.

11 Claims, 7 Drawing Sheets

U.S. PATENT DOCUMENTS 5,076,401 A * 12/1991 Ta et al. ............... 188/71.9
5,111,915 A    5/1992 Rupprecht ............ 188/73.45
5,921,356 A * 7/1999 Stringer et al. ....... 188/196 D
7,028,812 B1 * 4/2006 Wagner et al. ........... 188/71.1

OTHER PUBLICATIONS

Web page of Carlisle Industrial Brake & Friction, Bloomington, Indiana showing a Model DXP195 park brake.

* cited by examiner

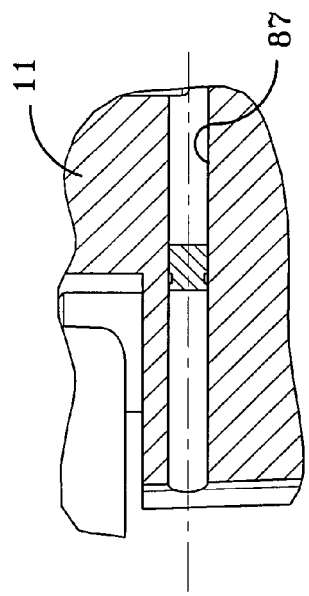
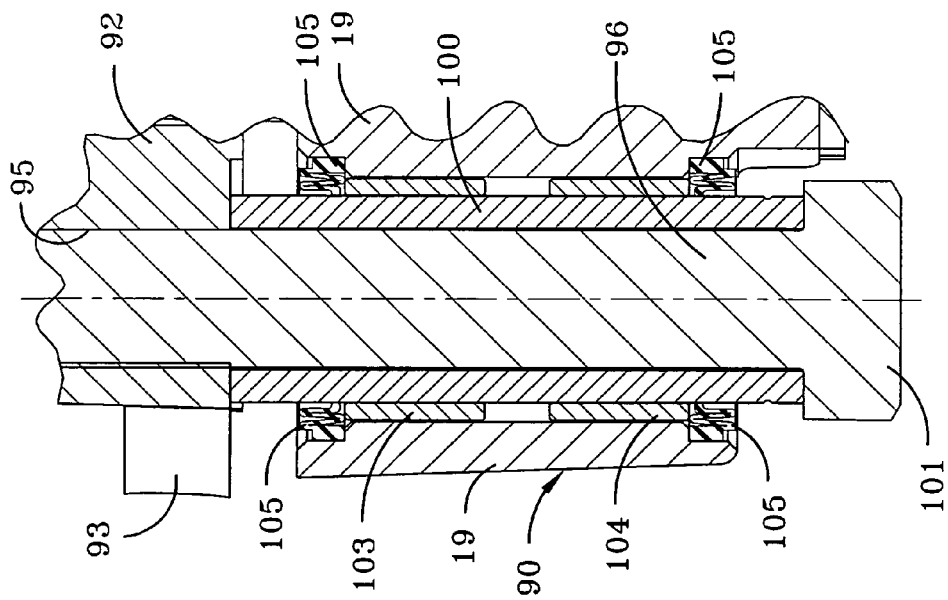

US 8,127,897 B2

CALIPER BRAKE SYSTEM

This application claims priority of provisional U.S. Application No. 60/961,881 filed Jul. 25, 2007, which is incorporated herein by reference.

TECHNICAL FIELD

The present invention relates generally to caliper brake systems. More particularly, the present invention relates to a caliper brake system that may be employed in conjunction with parking brakes for trucks and off-road vehicles of various types. More specifically, the present invention relates to an automatic caliper brake system for vehicle parking brakes wherein the brake calipers are spring applied when the vehicle hydraulic system is turned off and hydraulically released when the vehicle hydraulic system is energized.

BACKGROUND ART

Caliper brakes are well known in the field of parking brakes, and are commonly used on off-road vehicles such as construction equipment to supply a braking force when the vehicle is stationary. These parking brakes must provide a relatively high braking force in order to prevent movement of vehicles that are often extremely heavy, and must also be reliable.

All types of parking brakes typically require some type of manual activation by an operator, and subsequent manual deactivation of the brake when the vehicle is to be moved. While such manual activation or deactivation of the brake is not difficult or time consuming, it is often easy to forget. It is a fairly common for an operator of a vehicle to either forget to activate a parking brake after parking, or to forget to deactivate the parking brake when later trying to drive the vehicle. In the first instance, where the parking brake is not engaged, a dangerous situation may be created because the vehicle is more likely to begin moving without an operator at the controls if the parking brake is not engaged. In the second instance, where the parking brake remains engaged when an operator attempts to move the vehicle, a high amount of stress is placed both on the parking brake system and the motor.

In view of these problems, it is evident that the need exists for a reliable parking brake that requires no manual activation or deactivation by an operator.

DISCLOSURE OF THE INVENTION

It is thus an object of one aspect of the present invention to provide a caliper brake system that is automatically activated when a vehicle is turned off, and automatically deactivated when the vehicle is turned on.

It is an object of another aspect of the present invention to provide a caliper brake system, as above, that provides a high braking force.

It is an object of an additional aspect of the present invention to provide a caliper brake system, as above, having a means of adjusting the braking force provided by the brake.

These and other objects of the present invention, as well as the advantages thereof over existing prior art forms, which will become apparent from the description to follow, are accomplished by the improvements hereinafter described and claimed.

In general, a caliper brake system operable on a rotor of a vehicle, in accordance with the present invention, includes a housing, a bore within the housing and a piston slidably positioned within the said bore. A spring assembly biases the piston in an actuated position to engage the rotor. A fluid chamber is defined by the bore and the piston, and an hydraulic fluid supply network is adapted to provide pressurized fluid to the fluid chamber to selectively overcome the biasing force of the spring assembly and move the piston to an unactuated position to release the rotor.

In accordance with another aspect of the present invention, a caliper brake system includes a housing having a first end and a second end, and a bore is provided within the housing. An end plug has a cylindrical body and an annular projecting rim positioned within the bore adjacent to the second end. A piston is slidably positioned within the bore, and a spring assembly is positioned between the piston and the cylindrical body of the end plug and circumferentially within the annular projecting rim. The spring assembly includes at least one spring stack having an exterior spring, an intermediate spring, and an inner spring positioned on a common central axis providing a biasing force on the piston in a direction toward said first end of said housing to activate the brake. A fluid chamber is defined by the bore and the piston, and at least one annular seal positioned between the piston and the bore to prevent leakage therefrom. A fluid supply network is adapted to provide pressurized fluid to the fluid chamber to selectively overcome the biasing force acting on the piston, thereby deactivating the brake.

In accordance with yet another aspect of the present invention, a caliper brake system adapted to engage the rotor of a vehicle includes a pair of stators adapted to be positioned on opposing sides of the rotor. A piston engages one of the stators and is positioned within a bore. A spring assembly provides a biasing force to cause the stators to engage the rotor. A fluid supply network provides pressurized fluid to a fluid chamber causing the piston to overcome the biasing force of the spring assembly and causing the stators to disengage the rotor permitting the rotor to rotate freely.

A preferred exemplary caliper brake system according to the concepts of the present invention is shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 4 is an enlarged fragmentary sectional view taken substantially along line 4-4 of FIG. 2 showing attachment of the vehicle mounting bracket assembly to the housing for the brake system.

FIG. 5 is an enlarged fragmentary sectional view taken substantially along line 5-5 of FIG. 2 showing a plug blocking a duct in the housing interconnecting the two piston chambers therein.

PREFERRED EMBODIMENT FOR CARRYING OUT THE INVENTION

Figure 1:
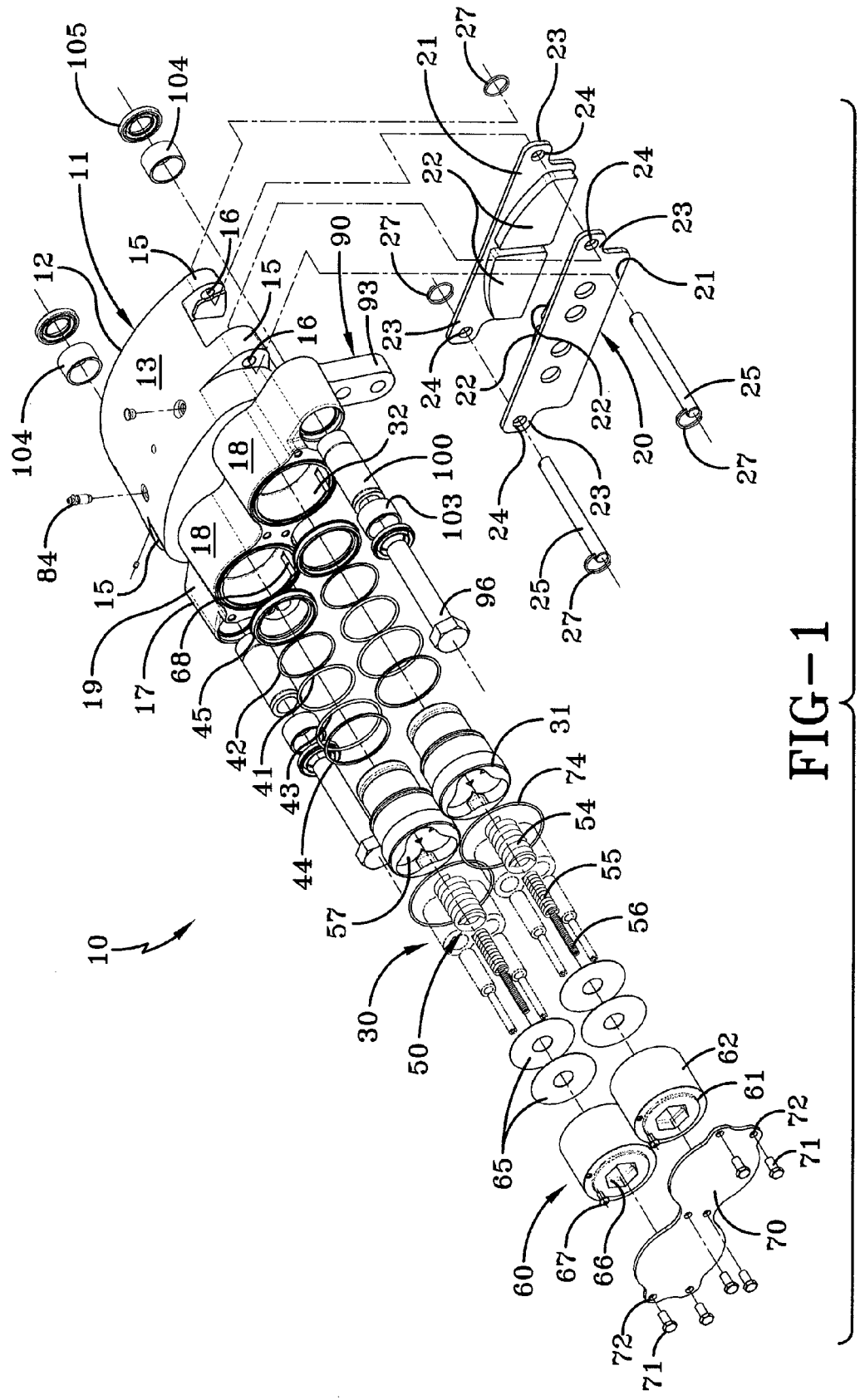
FIG. 1 is an exploded perspective view of a caliper brake system in accordance with the concepts of the present invention for mounting in operative relation to a conventional vehicle brake system rotor.
Figure 2:
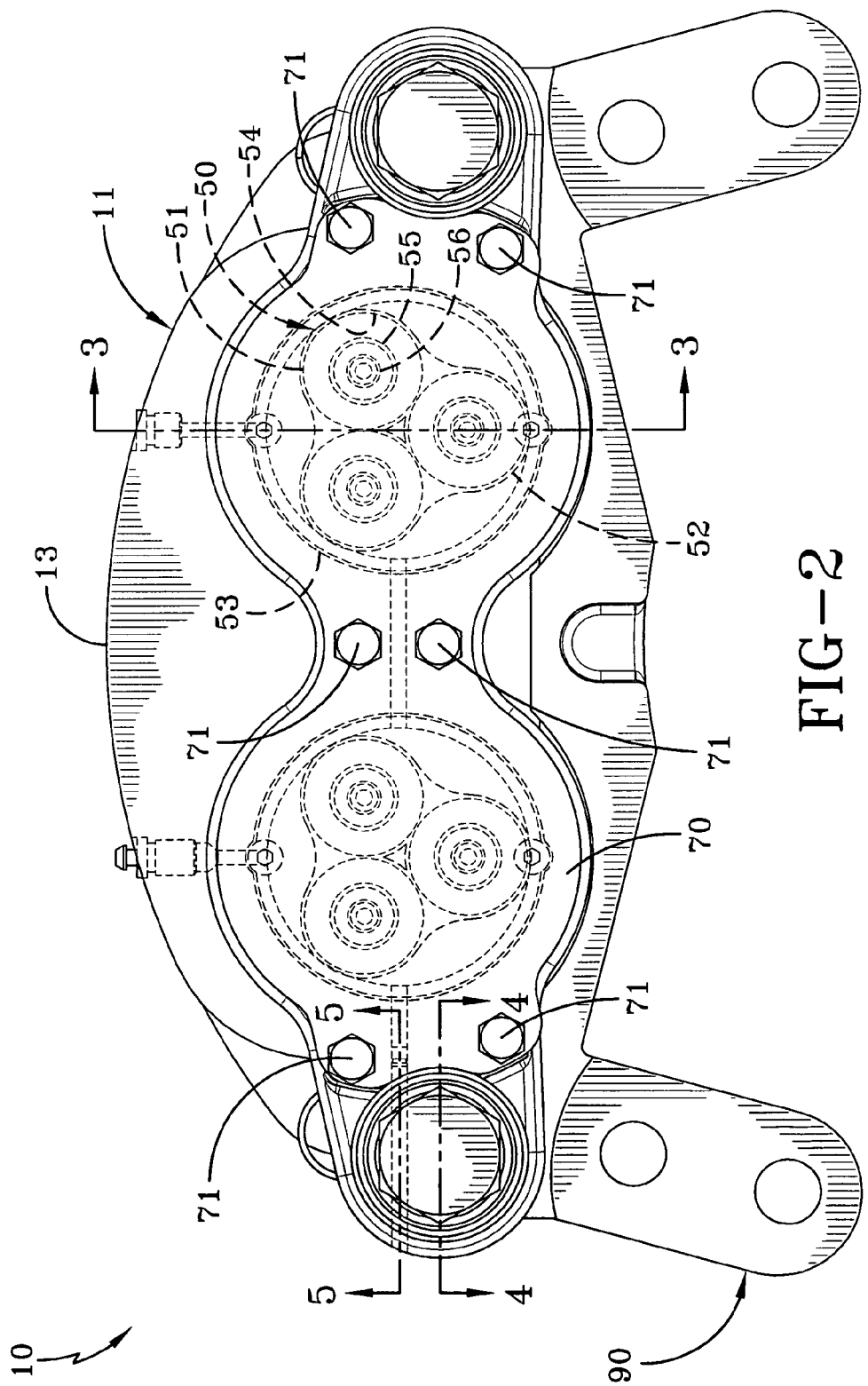
FIG. 2 is an enlarged piston assembly end elevational view of the brake system of FIG. 1 showing additional details including a portion of the vehicle mounting bracket assembly.

A caliper brake system according to the concepts of the present invention is generally indicated by the numeral 10 in FIGS. 1 and 2 of the drawings. The caliper brake system 10 includes a housing, generally indicated by the numeral 11, that carries and protects components thereof and locates it in operative relation to a conventional wheel rotor R, indicated in chain lines in FIGS. 3 and 8 of the drawings.

Figure 3:
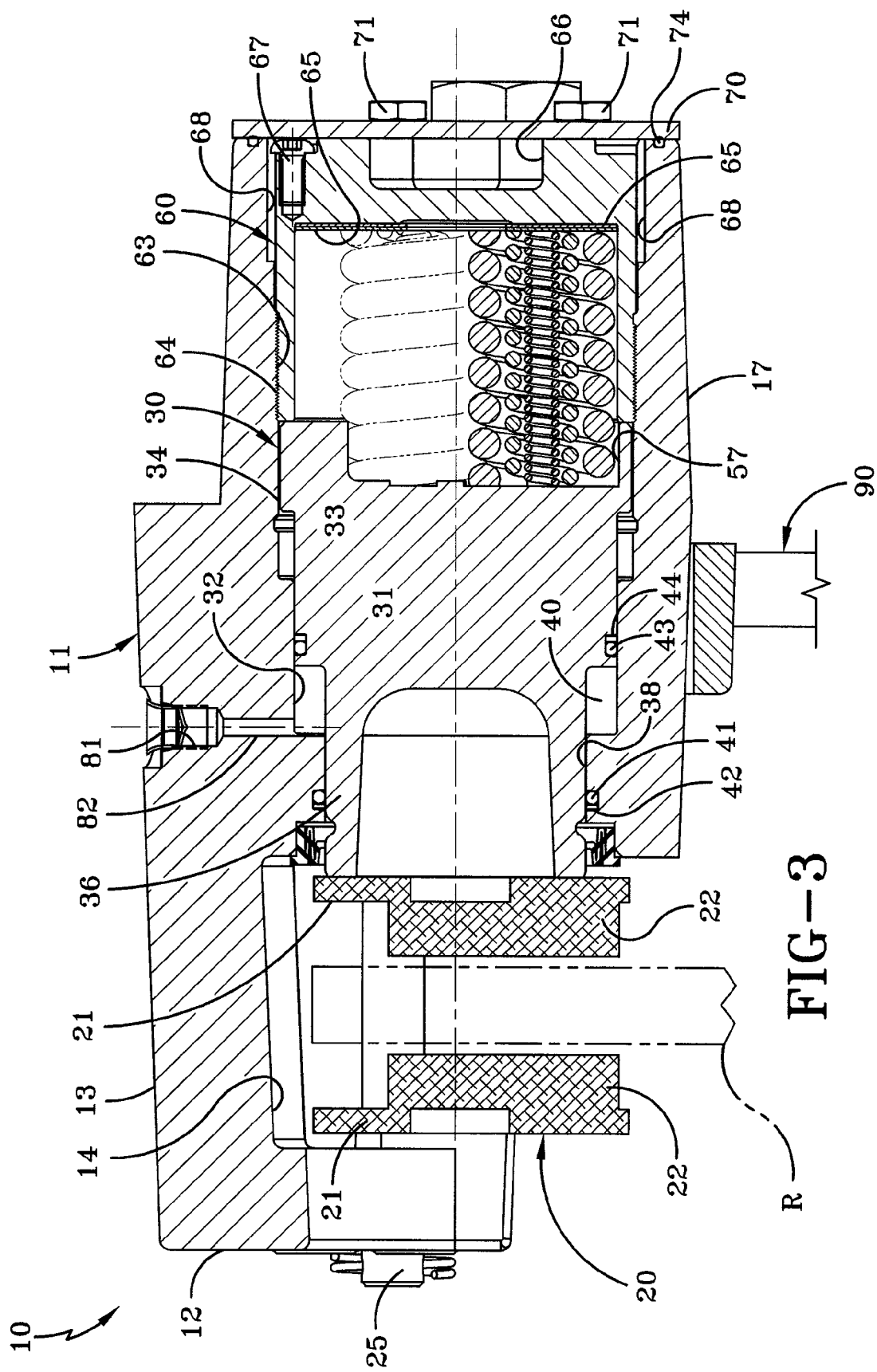
FIG. 3 is a fragmentary sectional view taken substantially along line 3-3 of FIG. 2 showing details of the piston assembly and the stator assembly mounted in operative relation to an exemplary brake system rotor.

The housing 11 has a stator assembly end 12 having an upward curved surface 13 as seen in FIGS. 1-3. The stator assembly end 12 has a cavity 14 underlying curved surface 13 that is adapted to enclose a portion of the rotor R.

Figure 8:
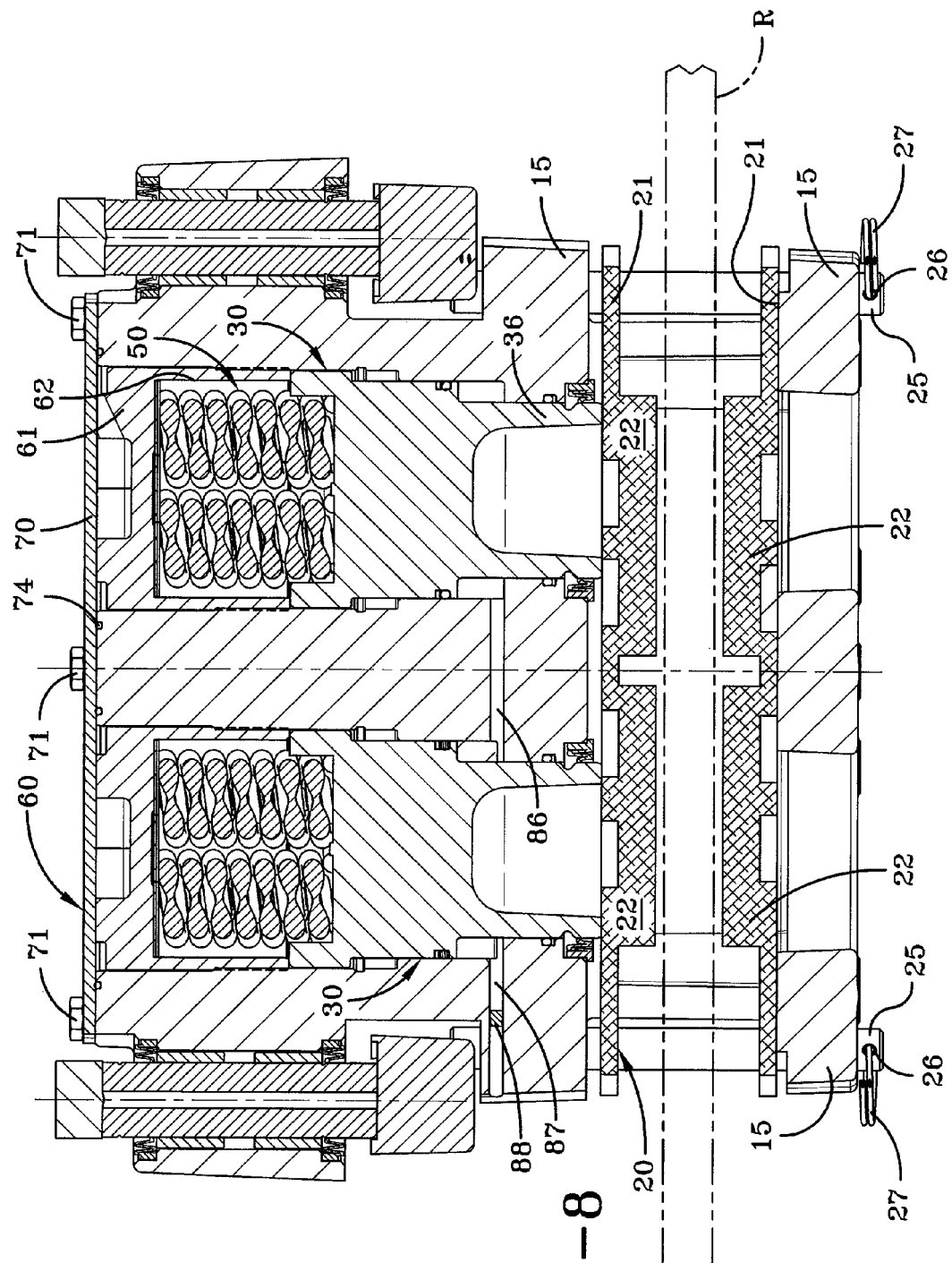
FIG. 8 is a sectional view taken substantially along line 8-8 of FIG. 6 showing other details of the piston assembly, the stator assembly and the vehicle mounting bracket assembly.

Referring particularly to FIGS. 1, 3 and 8, the cavity 14 in housing 11 also receives a portion of a stator assembly, generally indicated by the numeral 20. In particular, a pair of stator plates 21 are positioned within cavity 14 displaced axially to either side of rotor R so that a portion of rotor R is interposed therebetween. The stator plates 21 are positioned to substantially parallel rotor R and carry one or more pads 22 for engaging the rotor R. As shown, each stator plate 21 mounts two spaced pads 22 that may be fabricated of any of numerous friction materials known in the art. Each stator plate 21 has projecting ears 23 at the longitudinal ends thereof. The projecting ears 23 have bores 24 that receive stator pins 25 on which the stator plates 21 are freely slidably mounted.

To either lateral side of housing 11, as seen in FIG. 1, are a pair of spaced projecting shoulders 15 for mounting the stator assembly 20. The shoulders 15 have bores 16 that receive the stator pins 25. The shoulders 15 are spaced a distance to receive the stator plates 21 and the rotor R and to allow an extent of clearance therebetween, as seen in FIGS. 3 and 8. Displaced axially outwardly of the shoulders 15 relative to the stator plates 21 the stator pins 25 have bores 26 that receive kickout rings 27, such that the stator pins 25 are axially restrained relative to the shoulders 15 to maintain the stator assembly 20 in operative position.

The stator assembly 20 is operatively controlled by piston assemblies, generally indicated by the numeral 30 in FIG. 1. The piston assemblies 30 are partially located within a piston assembly end 17 of the housing 11. As shown, the piston assembly end 17 includes one or more substantially cylindrical projections 18 extending from the stator assembly end 12 of housing 11. As shown, there are two cylindrical projections 18, each enclosing a piston assembly 30.

As best seen in FIGS. 1, 3, 7 and 8, the piston assemblies 30 may be essentially identical and, thus, only one is described in detail. As shown, each piston assembly includes a cup-shaped piston 31 that moves within a stepped bore 32 in housing 11. The piston 31 has a body portion 33 having an outer cylindrical surface 34 that engages the maximum diameter chamber 35 in stepped bore 32. The piston 31 has a projecting flange 36 with a reduced diameter cylindrical surface 37 that operates in a reduced diameter chamber 38 in stepped bore 32 to engage the proximate or inboard stator plate 21 of stator assembly 20.

The piston 31 and stepped bore 32 thus form an annular fluid pressure chamber 40 for piston operating fluid. As best seen in FIG. 3, a combination O-ring 41 and backup ring 42 is located in housing 11 to one axial side of fluid pressure chamber 40, and a second combination O-ring 43 and backup ring 44 is located on piston 31 to the other axial side of fluid pressure chamber 40. Thus, the escape of piston operating fluid from the area of fluid pressure chamber 40 between the housing 11 and piston 31 is controlled. A sealing boot 45 may be positioned proximate the end of stepped bore 32 and the end of flange 36 to preclude entry of foreign matter therebetween.

The piston 31 of piston assembly 30 is urged into engagement with stator assembly 20 by a spring assembly, generally indicated by the numeral 50 in FIGS. 1, 2, 3, 7 and 8 of the drawings. Depending upon the force required to be imparted to the rotor R by the piston 31, the spring assembly 50 may be provided with one or more coil springs. As shown, there are three spring stacks 51, 52 and 53 circumferentially positioned within the piston diameter (FIG. 2), with each stack having three springs, namely outer spring 54, intermediate spring 55 and inner spring 56, of differing diameters and preferably being positioned on a common central axis. Therefore, the piston assemblies 30 each have nine (9) spring elements therein in the embodiment shown. In order to stabilize the spring stacks 51, 52 and 53, the piston 31 is provided with an axial recess 57 (FIGS. 1 and 3) for each of the spring stacks 51, 52, 53 that is sized to receive an outer spring 54.

The springs 54, 55 and 56 are restrained at the axial end opposite piston 31 by an end plug, generally indicated by the numeral 60, as seen in FIGS. 1 and 3. The end plug 60 has a cylindrical body 61 that telescopes into a stepped bore 32 with an annular projecting rim 62 that receives a portion of the spring stacks 51, 52, 53. A portion of the outer surface of rim 62 has threads 63 that matingly engage threads 64 in stepped bore 32 to selectively position cylindrical body 61 at an axial position in housing 11 to compress springs 54, 55, 56 to the extent necessary for the piston 31 to impart the requisite force to the rotor R. This procedure is employed during initial assembly and to compensate for wear of the pads 22.

The position of the axial end of spring stacks 51, 52, 53 opposite the piston 31 may be provided with one or more shims 65 to act as a slip plane to reduce resistance to rotation of end plug 60 relative to spring stacks 51, 52, 53. As best seen in FIGS. 1 and 3, two shims 65 are employed in the embodiment shown. In order to facilitate rotation of end plug 60 for threading relative to housing 11, the body 61 of end plug 60 may be provided with a shaped depression 66 adapted to receive a socket tool or wrench. Alternatively, it is to be appreciated that end plug 60 may have a projection or other structure that could be engaged to rotate it to effect the necessary threading. Once approximately the desired threading is accomplished, the end plug 60 may be locked against further rotation by a set screw 67 threaded into body 61 and extending into a short axial slot 68 of limited circumferential extent in the stepped bore 32 (FIGS. 1 and 3). While two diametrically opposite slots 68 are shown, more or fewer slots could be employed.

Referring to FIGS. 1-3, 7 and 8, the housing 11 axially outwardly of cylindrical projections 18 is closed by an end plate 70 that is essentially a flat cover held in place by a plurality of machine screws 71 extending through bores 72 in end plate 70 and into housing 11. The cylindrical projections 18 may mount O-rings 74 for engaging the end plate 70 to seal around the end plugs 60.

Figure 6:
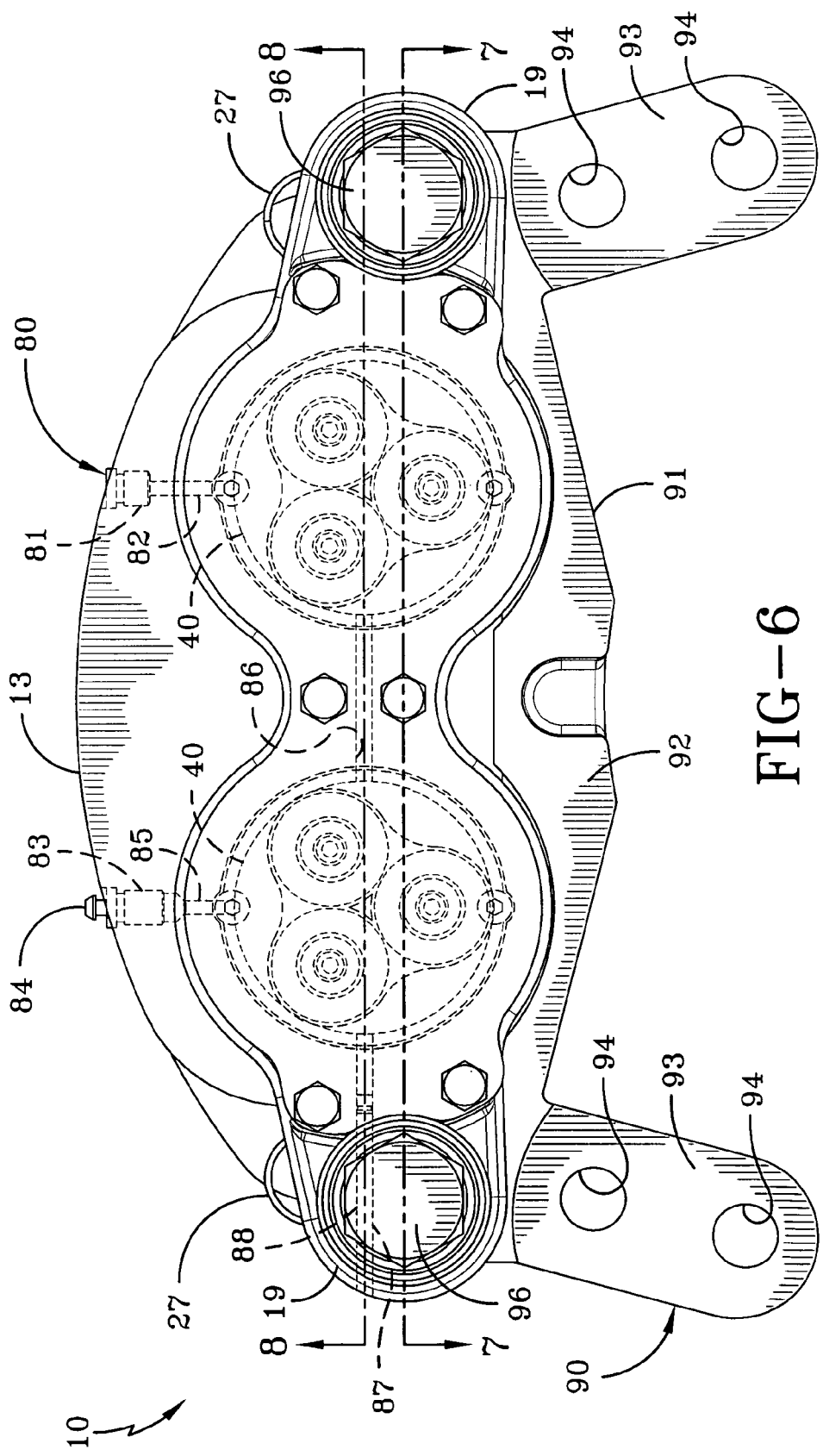
FIG. 6 is an end elevational view similar to FIG. 2.
Figure 7:
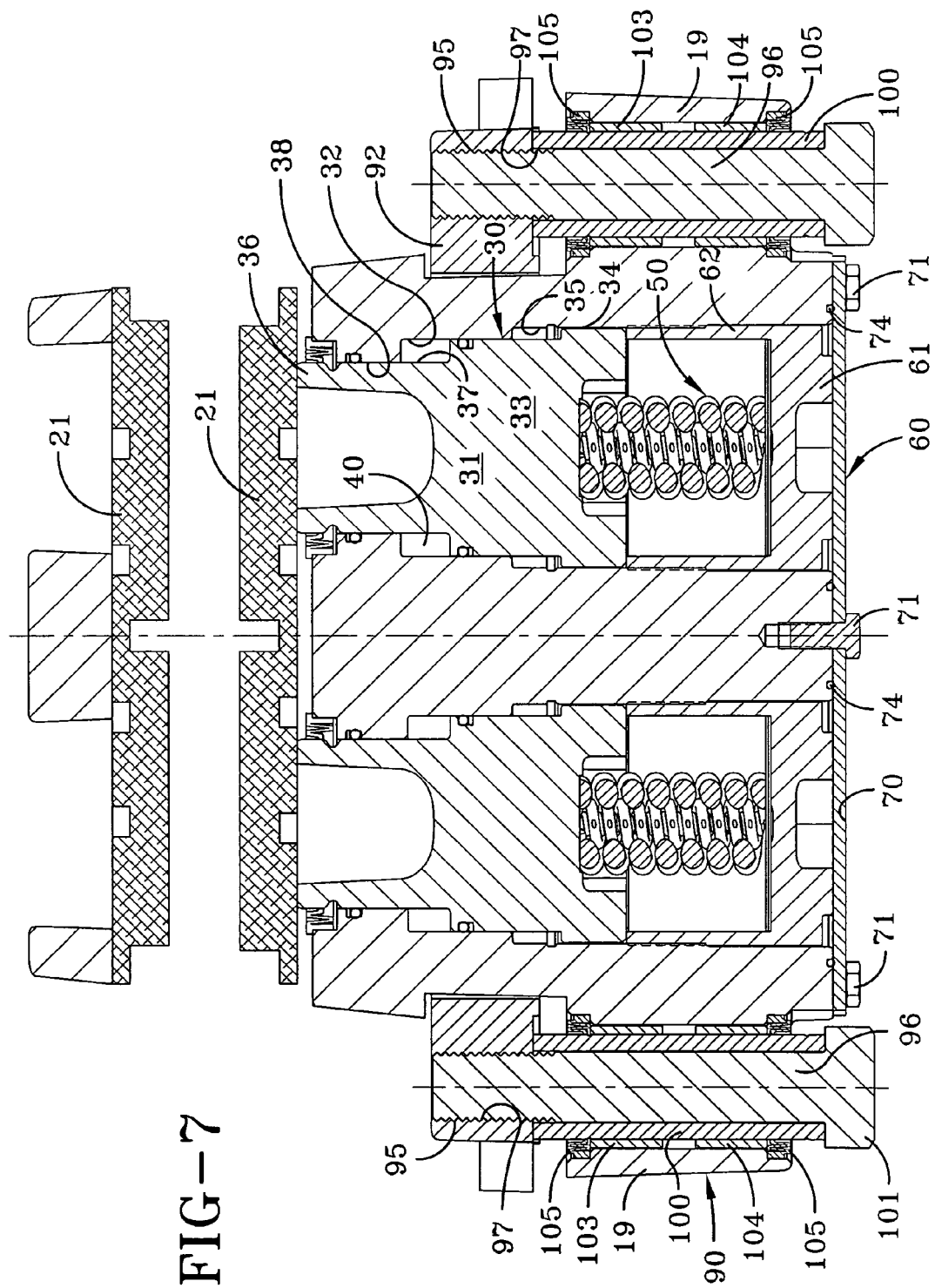
FIG. 7 is a sectional view taken substantially along line 7-7 of FIG. 6 showing details of the piston assembly, the stator assembly and the vehicle mounting bracket assembly.

The annular fluid pressure chambers 40 of piston assemblies 30 are supplied with piston operating fluid by a fluid supply network, generally indicated by the numeral 80, as best seen in FIG. 6. The fluid supply network 80 includes a fluid inlet port 81 in housing 11 having first channel 82 extending to the fluid pressure chamber 40 of one of piston assemblies 30 (FIGS. 6 and 3). The housing 11 has a second port 83 with a bleeder screw 84 for purging air from the network 80. A second channel 85 extends from second port 83 to the fluid pressure chamber 40 of the other piston assembly 30. A through channel 86 in housing 11 extends between the fluid pressure chamber 40 of the one piston assembly 30 to the fluid pressure chamber 40 of the other piston assembly 30 to thereby connect the inlet port 81 and the second port 83. An extension channel 87 of through channel 86 is blocked by a plug 88 to prevent the escape of piston operating fluid (see FIGS. 6 and 8). When pressurized piston operating fluid is introduced to fluid supply network 80 through fluid inlet port 81, the piston assemblies 30 overcome the spring assemblies 50 and assume the position depicted in FIGS. 3, 7 and 8 of the drawings.

The brake housing 11 has the stator assembly 20 mounted in operative relation to a wheel rotor R, as shown, by a mounting bracket assembly, generally indicated by the numeral 90. The mounting bracket assembly 90 has a yoke 91 with a cross member 92 and projecting arms 93, as best seen in FIG. 6. The arms 93 have bores 94 for receiving fasteners (not shown) to attach the mounting bracket assembly 90 to a vehicle having the brake system 10. The cross member 92 of yoke member 91 extends generally between the lateral sides of housing 11 and has threaded bores 95 that are axially aligned with sleeves 19 formed in the housing 11. The yoke 91 is operatively joined to housing 11 by bolts 96 extending through sleeves 19 and having threads 97 engaging the threaded bores 95 in yoke 91. To permit housing 11 to move axially of bolts 96 relative to yoke 91, the bolts 96 carry a spacer 100 that is axially longer than the sleeves 19 and may extend from bolt head 101 to the portion of cross member 92 where the threaded bores 95 are located. The sleeves 19 may advantageously carry a pair of spaced bushings 103 and 104 engaging the spacers 100 to facilitate the relative sliding movement. A boot 105 may be positioned at each axial extremity of each of the sleeves 19 to keep out foreign debris.

The housing 11 is in the position shown in the drawings with the stator plates 21 displaced from the rotor R when pressurized fluid is provided to the fluid supply network 80. When the supply of pressurized fluid is discontinued by shutting down the vehicle and/or the vehicle hydraulic system, the pistons 31 are actuated by the spring assemblies 50 to move the pads 22 of stator plates 21 into engagement with the rotor R thereby activating the brake. The pistons 31 drive the inboard stator plate 21 in engagement therewith into contact with the rotor R. The pressure on rotor R imparted by the inboard and outboard stators 21 is equalized by the fact that the outboard stator 21 is mounted on housing 11 and, thus, moves relative to the mounting bracket assembly 90 and rotor R as described hereinabove. Upon the re-supply of pressurized fluid to the fluid supply return, as when the vehicle is started, the brake is automatically released.

It should thus be apparent that a caliper brake system as described herein accomplishes the objects of the invention and otherwise substantially improves the art.

What is claimed is:

1. A caliper brake system operable on a rotor of a vehicle comprising a housing, a bore within said housing, a piston slidably positioned within said bore, a spring assembly biasing said piston in an actuated position to engage the rotor, a fluid chamber defined by said bore and said piston, an end plug having a cylindrical body and an annular projecting rim, said spring assembly abutting said cylindrical body, and said annular rim providing an axial stop for said piston, an axial slot in said bore adjacent said end plug, and a set screw extending through said cylindrical body of said end plug and projecting into said axial slot of said stepped bore to selectively lock said end plug against rotation, and a hydraulic fluid supply network adapted to provide pressurized fluid to said fluid chamber to selectively overcome the biasing force of said spring assembly and move said piston to an unactuated position to release the rotor, said bore including a threaded portion, and said annular projecting rim including a threaded portion to matingly engage said threaded portion of said bore to selectively position said cylindrical body of said end plug within said bore, thereby adjusting the force applied by said spring assembly on said piston.

2. The caliper brake system of claim 1, said housing having a first end and a second end, said first end having a cavity therein, and said second end encompassing said bore.

3. The caliper brake system of claim 2, further including a pair of stators slidably mounted at said first end of said housing and positioned at least partially within said cavity, said piston engaging one of said stators.

4. The caliper brake system of claim 1, further comprising an end plate covering said end plug, a plurality of fasteners to secure said end plate to said housing, and an O-ring seal positioned between said end plate and said housing.

5. The caliper brake system of claim 4, said piston having a body portion with an outer cylindrical surface engaging said stepped bore and an axial recess facing said end plug, said piston body also having a projecting flange extending toward said first end of said housing.

6. The caliper brake system of claim 5, said spring assembly including at least one spring stack, said spring stack having an outer spring, an intermediate spring, and an inner spring positioned on a common central axis.

7. The caliper brake system of claim 6, said spring assembly including three spring stacks circumferentially positioned with said axial recess of said piston body and engaging said end plug.

8. The caliper brake system of claim 7, further comprising at least one shim positioned between said spring stacks and said end plug.

9. The caliper brake system of claim 1, further comprising at least one annular seal between said piston and an inner surface of said stepped bore to prevent fluid leakage from said fluid chamber.

10. The caliper brake system of claim 9 having a pair of stepped bores, a pair of pistons and a pair of fluid chambers; said hydraulic fluid supply network including a fluid inlet port in said housing, a first channel extending between said inlet port and one of said fluid chambers, an outlet port having a bleeder screw, a second channel extending between said outlet port and the other of said fluid chambers, and a through channel extending between said pair of fluid chambers.

11. A caliper brake system comprising a housing having a first end and a second end; a bore within said housing; an end plug having a cylindrical body and an annular projecting rim positioned within said bore adjacent said second end; a piston slidably positioned within said bore; a spring assembly positioned between said piston and said cylindrical body of said end plug and circumferentially within said annular projecting rim, said spring assembly including at least one spring stack, each spring stack having an exterior spring, an intermediate spring, and an inner spring positioned on a common central axis providing a biasing force on said piston in a direction toward said first end of said housing to activate the brake, said piston having a body portion, an axial recess in said body portion facing said end plug, and a projecting flange extending toward said first end of said housing, with an end of said at least one spring stack positioned within said axial recess; a fluid chamber defined by said bore and said piston with at least one annular seal positioned between said piston and said bore to prevent leakage therefrom; and a fluid supply network adapted to provide pressurized fluid to said fluid chamber to selectively overcome said biasing force acting on said piston, thereby deactivating the brake.

* * * * *